T. C. WOODWORTH.
NUT LOCK.
APPLICATION FILED JUNE 18, 1908.
905,618.
Patented Dec. 1, 1908.
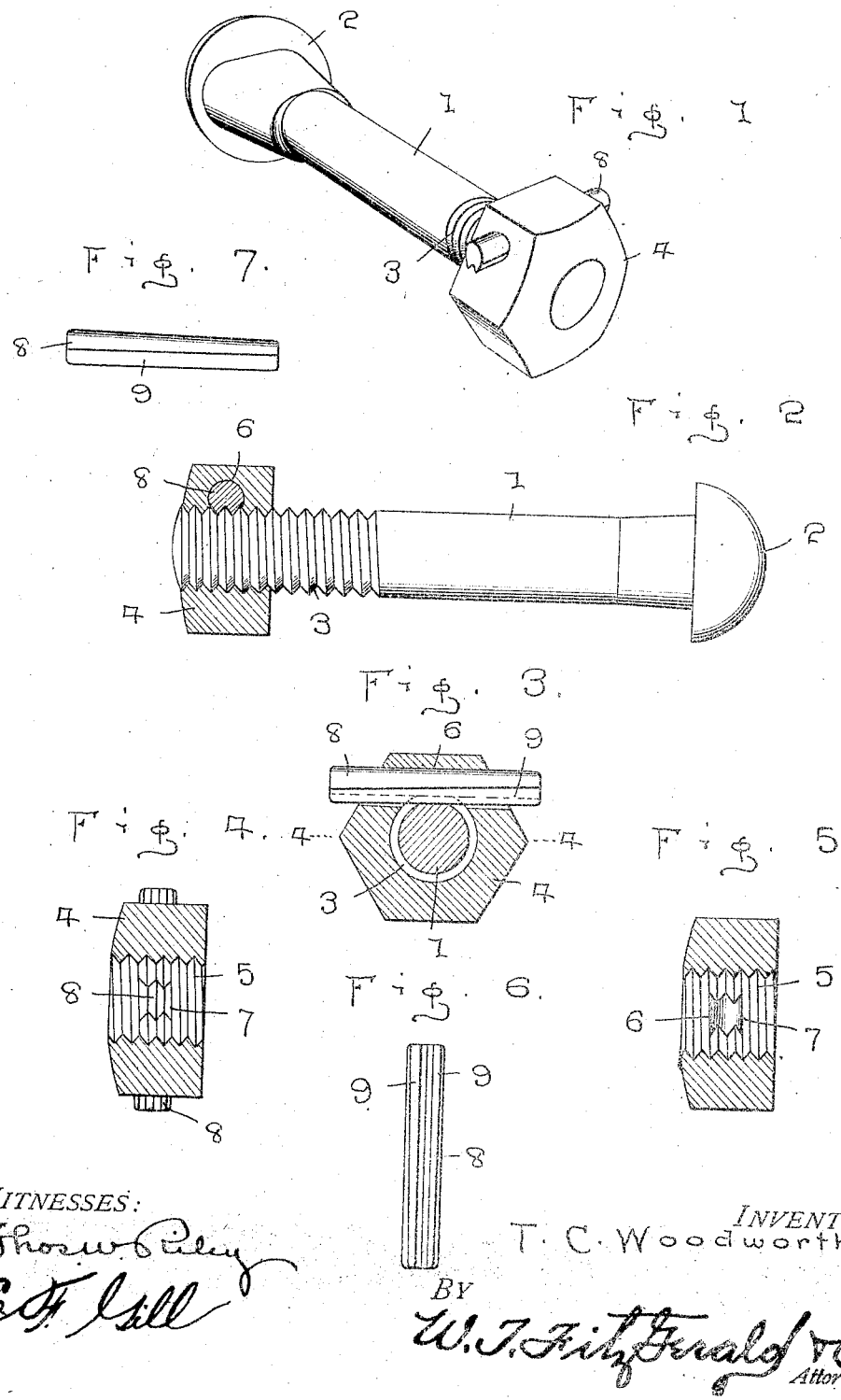

UNITED STATES PATENT OFFICE.

TODD C. WOODWORTH, OF WILLIAMS, ARIZONA TERRITORY, ASSIGNOR TO FRANK B. KEEVER.

NUT-LOCK.

No. 905,618.　　　Specification of Letters Patent.　　　Patented Dec. 1, 1908.

Application filed June 18, 1908. Serial No. 439,217.

*To all whom it may concern:*

Be it known that I, TODD C. WOODWORTH, a citizen of the United States, residing at Williams, in the county of Coconino and Territory of Arizona, have invented certain new and useful Improvements in Nut-Locks; and I do hereby declare the following to be a full, clear, and exact description of the invention, such as will enable others skilled in the art to which it appertains to make and use the same.

My invention relates to new and useful improvements in nut locks and more particularly to that class employing a locking device in connection with the threads on the bolt to lock the nut in its adjusted position, and my object is to provide a locking device adapted to be entered through a recess in the nut and engage the threads on the bolt.

A further object is to provide means on the locking device adapted to engage the faces and edge of the threads on the bolt and bind on the periphery of the bolt, whereby the nut will be securely locked in its adjusted position.

A further object is to so arrange the engaging mechanism on the locking device whereby when the locking device is properly inserted, the locking action thereon will be increased when rotating pressure is applied to the nut to remove the same and a still further object is to so construct the locking device that a seat or shoulder will be provided thereby, when so desired.

Other objects and advantages will be hereinafter referred to and more particularly pointed out in the claims.

In the accompanying drawings which are made a part of this specification, Figure 1 is a perspective view of a bolt showing a nut thereon in locked position. Fig. 2 is a side elevation thereof, showing the nut in section. Fig. 3 is a transverse sectional view through the bolt and nut, showing the locking pin in full lines. Fig. 4 is a sectional view through the nut as seen on line 4—4, Fig. 3. Fig. 5 is a similar view, with the locking pin removed. Fig. 6 is a plan view of the locking pin removed from the nut, and, Fig. 7 is an elevation of a slightly modified form of locking pin.

Referring to the drawings in which similar reference numerals designate corresponding parts throughout the several views, 1 indicates a bolt such as is commonly used in railway track construction, said bolt having a head 2 at one end and the usual or any preferred form of thread 3 at the opposite end, said thread being extended a suitable distance along the bolt as may be desired.

Adapted to engage the threaded end of the bolt 1, is the usual or any preferred form of nut 4, although said nut is preferably made hexagonal, the opening in said nut being provided with threads 5 adapted to engage the threads 3 and cause the nut to travel on the bolt 1 and in order to securely lock the nut on the bolt at any preferred point, a bore 6 is extended laterally through the nut 4 from face to face thereof, said bore being so positioned as to intersect the threads 5 in the nut and remove a portion thereof, forming a recess 7 at a point substantially at the longitudinal center of the bore 6, whereby the threads on the bolt when being passed through the nut will enter said recess and protrude into the bore 6.

The nut 4 is locked in its adjusted position by introducing a pin 8 through the bore 6, one portion of the periphery of the pin being adapted to engage the portions of the threads extending through the recess 7 and to form a positive locking action between the pin 8 and the threads 3, said pin is provided on its engaging face with longitudinally extending ribs 9, which ribs extend from end to end of the pin 8 and are preferably formed in pairs, although if preferred, a single rib may be employed if deemed expedient.

The ribs 9 are substantially wedge shape in cross section and are so spaced that when the pin is entered through the bore 6 under pressure, both faces of the thread 3 intersecting the center of the recess 7 will be firmly engaged by the inner faces of the ribs 9, while the opposed faces of the threads adjacent each end of the recess 7 will be gripped by the outer faces of said ribs and as the outer faces of the last mentioned threads are engaged by the threads 5 adjacent each end of the recess 7, said threads 3 will be prevented from yielding or spreading laterally thus providing a firm gripping surface for the pin and positively locking the nut in its adjusted position.

The bore 6 is preferably at right angles to the axial trend of the bolt 1, while the threads 3 are more or less spirally arranged on the bolt, whereby when the pin 8 is introduced through the bore 6, the ribs 9 will be slightly out of alinement with the trend of the threads 3, as best shown in Fig. 4, this slight variation of the path of the ribs with respect to the threads, causing the faces of the ribs to more firmly engage the faces of the threads and give a lateral clamping effect at the point of engagement between the threads and ribs.

To prevent the pin from becoming loosened by turning or attempting to turn the nut reversely to remove the same from the bolt, the ribs 9 are preferably slightly inclined from one end of the pin, as best shown in Fig. 3 and by always introducing the pin from one end of the bore, the reverse pressure on the nut, in view of the taper of the ribs, will cause the pin to more firmly engage the threads on the bolt and thereby prevent any reverse movement of the nut. Instead, however, of forming the ribs 9 on an inclined plane, the curved surface of the pin 8 may be inclined as shown in Fig. 7, and thereby accomplish the same result as when the ribs are inclined.

If preferred, the ribs 9 may be constructed of a slightly greater depth than the height of the threads 3, or the bore 6 placed slightly nearer the axial center of the nut whereby when the pin has been introduced through the bore 6, the apices of the ribs will displace a portion of the surface of the bolt at the base of the threads 3, while the apex of that thread between the ribs will be likewise slightly depressed or flattened, thereby forming a base or shoulder for the ribs, the holding action of the pin in this instance being similar to the action of a key on a flat surface or seat.

In applying the bolt to use, it is properly introduced through an object and the nut 4 turned thereon until the object is firmly clamped between the head 2 and nut 4, when the pin 8 is introduced through the bore 6 and the ribs thereon forced into engagement with the threads on the bolt this result being accomplished in any suitable manner as by delivering a blow, or a number of blows, on the end of the pin and in view of the fact that it takes but a minor blow to release the pin, the same may be positively secured in the bore by slightly depressing the entering end of the pin, after it has passed through and beyond the face of the nut.

When the ribs 9 are so constructed as to displace a portion of the surface of the bolt and thread, to form a flat seat for said ribs, it will be clearly understood that said displacement is so slight as not to mutilate the thread to such an extent as to prevent the nut 4 from readily turning on said threads and in this instance the key is preferably constructed of a slightly harder grade of metal than the bolt 1 so that the ribs or pin will not be forced out of shape when entered into engagement with the nut. It will likewise be seen that the nut can be locked at any point upon the bolt and the nut can be readily removed from the bolt by first removing the pin 8 from the bore in the nut. It will further be seen that as the pin is introduced after the nut has been turned home said pin will not interfere with the free use of a wrench for turning the nut and that the same pin may be used indefinitely for securing the nut in its locked position.

What I claim is:

1. The combination with a bolt having threads thereon and a nut coöperating with said bolt having a bore therethrough; of a locking pin having ribs thereon of a greater depth than the height of the threads on the bolt adapted to engage the threads on the bolt and lock the nut, the trend of said ribs being slightly at variance from the trend of the threads on the bolt.

2. In a nut lock, the combination with a bolt having threads at one end, and an interiorly threaded nut coöperating with said bolt, said nut having a bore therethrough displacing a portion of the threads in the nut; of a pin adapted to enter said bore, ribs extending longitudinally of the pin, said ribs being tapered from end to end of the pin and extending at an angle to the trend of the threads on the bolt.

3. In a nut lock, the combination with a bolt having threads thereon; of an interiorly threaded nut adapted to coöperate with the bolt, said nut having a bore extending laterally therethrough from face to face and located to intersect and displace a portion of the threads in the nut, a pin adapted to enter said bore, ribs on said pin of greater depth than the height of the threads on the bolt, whereby when said pin is driven into the bore, the surface of the bolt between the threads thereon and the upper edge of the thread between the ribs will be flattened to form seats for the ribs.

4. In a nut lock, the combination with a bolt having threads thereon, and an interiorly threaded nut adapted to engage the threads on the bolt said nut having a bore extending laterally therethrough and removing a portion of the threads in the nut to form a recess, of a pin adapted to be entered through said bore and means on said pin adapted to form a flattened seat between the threads on the bolt and at the apex of the threads on the bolt.

5. In a nut lock, the combination with a bolt having threads thereon, of an interiorly threaded nut having a bore extending laterally therethrough and a recess connecting said bore with the interior of the nut, a pin adapted to pass through said bore and means on the pin adapted to engage both faces of one thread on the bolt and one face of the threads at opposite sides of the first mentioned engaged thread said means forming seats between the threads on the bolt and on the apex of the first mentioned thread.

6. In a nut lock, the combination with a bolt having threads thereon of an interiorly threaded nut having a bore, extending through the nut in position to intersect the opening in the nut and form a communicating recess between the bore and opening and means adapted to be entered through said bore and engage the threads on the bolt and form seats between the bolt threads and on the apex thereof.

7. In a nut lock, the combination with a bolt having threads thereon, of an interiorly threaded nut having a bore extending therethrough in position to intersect the opening in the nut adjacent the periphery of the opening, a pin adapted to extend through said bore and ribs on said pin adapted to engage the threads entering said recess and form seats on the apex of and between said bolt threads said ribs engaging said threads at an inclination.

In testimony whereof I have signed my name to this specification in the presence of two subscribing witnesses.

TODD C. WOODWORTH.

Witnesses:
C. A. NEALE,
E. F. GILL.